United States Patent [19]

Tominaga

[11] Patent Number: 4,465,351

[45] Date of Patent: Aug. 14, 1984

[54] MOTOR-OPERATED FILM DRIVING DEVICE FOR CAMERA

[75] Inventor: Shinji Tominaga, Sakai, Japan

[73] Assignee: Minolta Camera Kabushiki Kaisha, Osaka, Japan

[21] Appl. No.: 424,741

[22] Filed: Sep. 27, 1982

[30] Foreign Application Priority Data

Sep. 28, 1981 [JP] Japan ............................. 56-154497

[51] Int. Cl.³ ............................................. G03B 1/18
[52] U.S. Cl. .............................. 354/173.11; 354/214
[58] Field of Search ............... 354/173, 214, 173.1, 354/173.11

[56] References Cited

U.S. PATENT DOCUMENTS 3,598,033  8/1971  Sasaki ................................. 354/214
3,946,409  3/1976  Toyoda .
4,112,449  9/1978  Akasaka .
4,306,794  12/1981  Fukahori et al. ..................... 354/214
4,400,074  8/1983  Akiyama et al. .................... 354/214

Primary Examiner—Russell E. Adams
Attorney, Agent, or Firm—Watson Cole Grindle & Watson

[57] ABSTRACT

A motor-operated film driving device for cameras is composed of a motor driving circuit switchable from a first state for driving a motor forward for film winding to a second state for short-circuiting the motor and further to a third state for driving the motor reverse for rewinding the film, a film tension detection circuit for generating a detection signal when it detects film overtension which occurs upon completion of exposure of all its frames and a delay circuit which generate a delay signal upon the lapse of a predetermined time from the moment of generation of the detection signal. The motor driving circuit switches from the first state to the second state in response to the detection signal, and from the second state to the third state in response to the delay signal.

5 Claims, 1 Drawing Figure

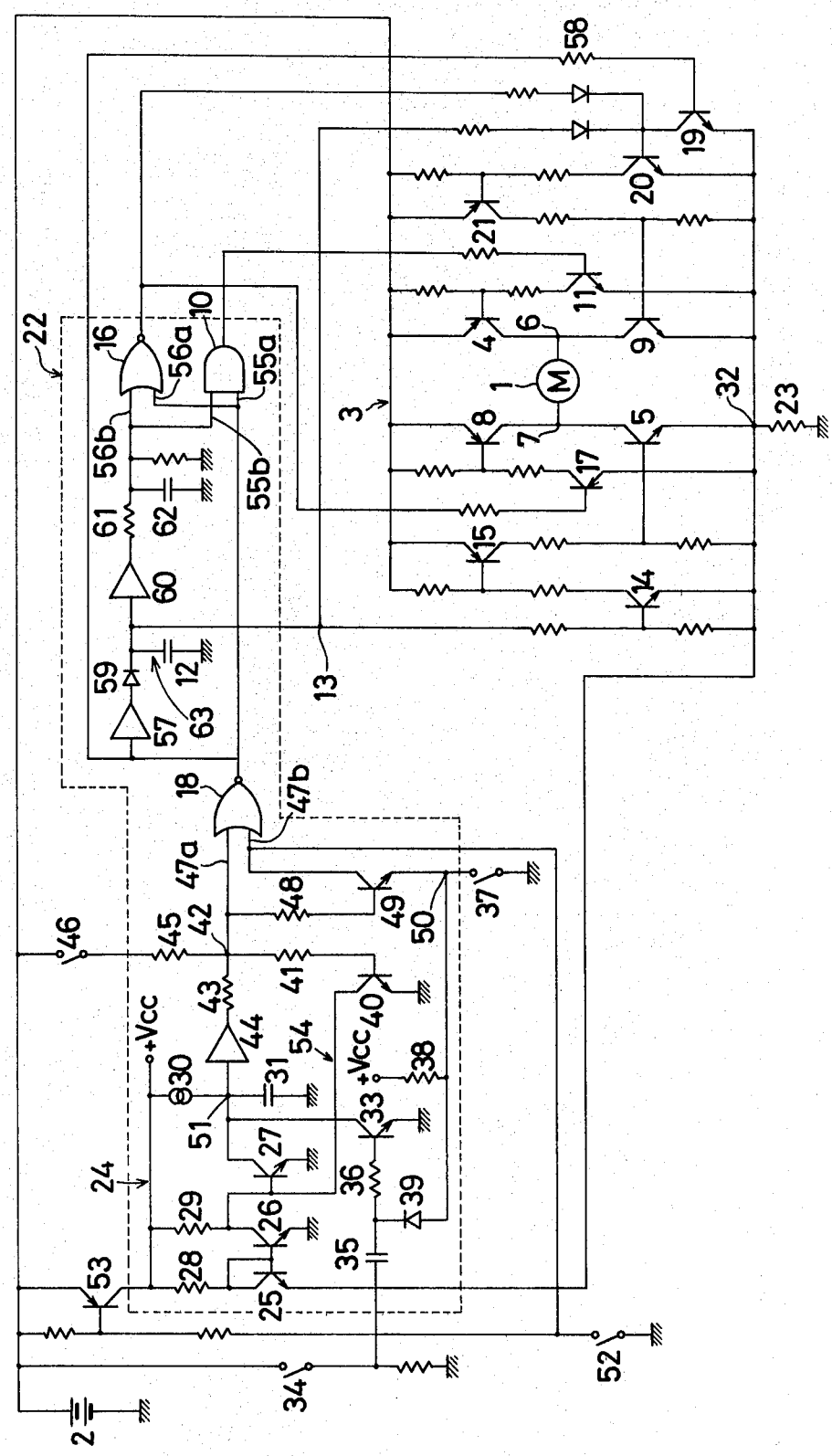

MOTOR-OPERATED FILM DRIVING DEVICE FOR CAMERA

BACKGROUND OF THE INVENTION

1. Field of the Invention

The present invention relates to a motor-operated film driving device for cameras which performs automatic film winding upon completion of exposure of each frame thereof and further automatic film rewinding upon completion of exposure of all the frames thereof.

2. Description of the Prior Art

In a motor-operated automatic film winding device the motor is forced to stop when the film winding is inhibited upon completion of exposure of all film frames with resultant over-tension of the wound-up film. The motor torque then increases gradually with increasing motor current and the film is ruptured when the torque has exceeded the film's critical strength. This causes a waste of electric power as well. As a countermeasure therefor there is a known device which detects the increase of the motor current due to the forced stoppage of the motor or the increase of the tention of the film for interrupting power to the motor or warning of the using-up of the film. Any of these devices however, are directed only to such detection, relating in no case to procedures after the motor stoppage or the provision of a warning.

SUMMARY OF THE INVENTION

It is an object of the present invention to provide a motor-operated film driving device for cameras which automatically starts film rewinding upon the detection of forced motor stoppage in the course of film winding after termination of exposure of all of the frames of the film.

It is another object of the present invention to provide a motor-operated film driving device of the above described type which, upon the switching from the film winding to the film rewinding operation avoids influence of electromotive force induced by residual torque resulting from the preceeding motor running for the film winding.

To accomplish these objects, a motor-operated film driving device of the present invention is provided with a reversible motor, a motor driving circuit and a control circuit therefor. The control circuit includes a film tension detecting means for generating a detection signal upon detection of over-tension applied to a wound film and a delay circuit for generating a delay signal upon lapse of a given period of time after the generation of the detection signal. The motor driving circuit is switchable from a first state for driving the motor forward for the film winding, a second state for short-circuiting the motor for stopping the film winding and a third state for driving the motor in reverse for the film rewinding. The motor is connected with the control circuit such that it is switched from the first state to the second state in response to the detection signal and further to the third state in response to the delay signal.

According to the film driving device of the present invention, switching from the film winding to the film rewinding operation is automatically achieved by the detection of over-tension applied to the wound film, making it unnecessary for a camera operator to manually rewind the film or to manually start the motor running for the film rewinding. Additionally, upon automatic switching from the film winding to the film rewinding operation, the delay circuit serves to keep the motor short-circuited until the electromotive force induced by the residual torque from the preceeding forward motor running disappears, whereby influence of the electromotive force on the film rewinding is effectively avoided.

The above and other objects and features of the present invention will become more apparent from the following description of a preferred embodiment of the present invention taken in conjunction with the accompanying drawing.

BRIEF DESCRIPTION OF THE DRAWING

The drawing is a circuit diagram showing a preferred embodiment of the present invention.

DESCRIPTION OF THE PREFERRED EMBODIMENT

Referring to the drawing, reference numeral 1 denotes a film winding and rewinding motor and numeral 2 a power source. Shown as 3 is a motor driving circuit so arranged that the motor 1 is driven in the direction for winding the film (forward rotation) when both transistors 4 and 5 are conductive allow to current to flow from a node 6 to a node 7. The motor 1 is driven in the direction for rewinding the film (reversing) when both transistors 8 and 9 are conductive to allow current to flow from the node 7 to the node 6. When the motor rotates forward or reverses, its driving force is applied to a film transport mechanism (not shown) so that the film is automatically wound or rewound.

Meanwhile, when the transistors 5 and 9 are simultaneously conductive the motor 1 is short-circuited and caused to stop. When these transistors are of relatively high DC amplification rates $h_{FE}$, the internal resistance to the current flowing from the emitter to the collector during conduction, is reduced. This is convenient for producing the aforesaid state of short-circuiting.

The transistor 4 becomes conductive when a transistor 11 is made conductive by a "high" voltage from an AND gate 10, while the transistor 5 becomes conductive when a node 13 connected with one end of a capacitor 12 is at the "high" voltage level to make transistors 14 and 15 conductive.

The transistor 8 becomes conductive when a transistor 17 is made conductive by a "high" voltage from an NOR gate 16, while the transistor 9 becomes conductive when a transistor 19 is blocked by a "low" voltage from another NOR gate 18 and when transistors 20 and 21 are made conductive by either a "high" voltage at the aforesaid node 13 or a "high" voltage from the NOR gate 16.

The respective transistors 4, 5, 8 and 9 are here used as switches for driving the motor in either the forward or the reverse direction or stopping it by short-circuiting, and are controlled as aforesaid in response to the outputs from a control circuit 22 having therein the aforesaid gates 10, 16 and 18 as well as the capacitor 12.

The current flowing through the motor 1 flows to the ground through resistor 23 and returns to the power source 2. The voltage then produced across the resistor 23 is monitored by a film tension detecting circuit 24 constituting a part of the control circuit 22, and thus detected is the increase in voltage according to the increase of motor current as the motor 1 is forced to stop due to the over-tension of the wound-up film.

The film tension detecting circuit 24 is composed of, among other components, transistors 25, 26 and 27, resistors 28 and 29, a constant-current power source 30 and a capacitor 31. The resistor 28 and the diode-connected transistor 25 constitute a level shifting circuit which serves to shift up the potential at node 32 connected to the resistor 23 by a constant voltage appearing across the transistor 25. That is, this circuit serves to transmit the variation of the emitter potential of the transistor 25 connected to the node 32 to the base of the transistor 25. When the motor 1 is running in forward, a voltage of 70 mV appears at node 32 with the resistance of the resistor 23 set, for instance, at 0.1 ohm for the motor current of 700 mA, and when the motor 1 is forced to stop due to the over-tension of the wound-up film, the motor current increases to more than 1A and a voltage of more than 100 mV appears at the node 32. This change of voltage level at the node 32 is transmitted to the base of the transistors 25 and 26.

The resistances of the resistors 28 and 29 are so set that, when the motor 1 is running forward, the working point of the transistor 26 is controlled by the base voltage of the transistor 25 to be in the active region. Generally a transistor has a logarithmic property of its collector current being varied two-fold when its base voltage is varied by 18 mV. Hence if the voltage of the node 32 is increased as much as 30 mV, the transistor 26 having been in the active region is brought into the saturated region due to the resultant increase of the collector current.

When the transistor 26 is in the active region, the transistor 27 is in the saturated conductive state with part of the current flowing through the resistor 29 being supplied to the base of the transistor 27, and is blocked or made nonconductive when the transistor 26 is in the saturated state.

Thus, the transistor 27 is conductive so that the collector voltage is at the "low" level, when the motor 1 is running forward and is blocked so that the collector voltage is shifted to the "high" level when the motor 1 is forced to stop.

When the transistor 27 has changed from the conductive state to the blocked state, the collector of the transistor 27 is kept for a while at the "low" voltage due to the presence of the capacitor 31. This delaying function by the capacitor 31 prevents possible temporary blocking of the transistor 27 due to the starting current upon starting of the motor 1.

Also, assuming that the resistance of the resistor 23 is proportional to the absolute temperature, it serves to keep the motor current at the time of over-tension of the wound-up film roughly constant against variations in the ambient temperature.

A transistor 33 connected in parallel with the transistor 27 receives bias current temporarily from the power source 2 through a capacitor 35 and a resistor 36 when a switch 34 is closed with a shutter release button (not shown) pressed, and also receives the bias current through a resistor 38, a diode 39 and a resistor 36 when a switch 37 is opened. The switch 37 is closed when the existence of film is detected and opened when rewinding of film is over (i.e. when the leader portion of the film has come off the spool. When the transistor 33 becomes conductive, the capacitor 31 is discharged fully.

Also, the transistor 27, with its base connected with the collector of a transistor 40, is arranged to be blocked when the transistor 40 becomes conductive. The transistor 40 has its base connected to the node 42 through a resistor 41. The node 42 is connected with the output terminal of a buffer amplifier 44 through a resistor 43 and with the positive terminal of the power source 2 through a resistor 45 and a manual film rewinding switch 46 respectively. The node 42 is further connected with the input terminal 47a of the NOR gate 18 and with the base of a transistor 49 through a resistor 48, respectively. The emitter of the transistor 49 is connected with one terminal of the switch 37 through a node 50, and this node 50 is connected with the anode of the diode 39 and one end of the resistor 38. The input terminal of the buffer 44 is connected with node 51 between the constant-current power source 30 and the capacitor 31 and node 51 is connected with the collectors of the transistors 27 and 33, respectively.

The control circuit 22 is connected to the collector of transistor 53 which is made conductive when a switch 52 is closed. This switch 52 is closed upon completion of exposure of a frame and opened when shutter charging is over, is and serves as a power switch to allow power supply to the control circuit 22. The other input terminal 47b of the NOR gate 18 is connected with the collector of the transistor 49 and the positive end of the switch 52, respectively.

The output terminal of the NOR gate 18 is connected with the input terminal 55a of the AND gate 10, the input terminal 56a of the NOR gate 16, the input terminal of a buffer amplifier 57 and the base of the transistor 19 through a resistor 58, respectively. The output terminal of the buffer amplifier 57 is connected with one end of the capacitor 12 and the input terminal of a buffer amplifier 60, respectively, through diode 59. The output terminal of the buffer amplifier 60 is connected through a resistor 61, with one end of the capacitor 62, the other input terminal 55b of the AND gate 10 and the other input terminal 56b of the NOR gate 16, respectively.

The operation of the device of the invention is described in detail below.

First assume the case where the camera is not loaded with a film. When the shutter mechanism (not shown) is released by pressing the shutter release button, the exposing operation follows and upon completion of the exposing operation, the switch 52 is closed. The transistor 53 is then made conductive as the base current flows through the switch 52, whereby the control circuit 22 is now supplied with power. Since the camera is not loaded with a film, there occurs no tension of the film, the transistor 27 of the film tension detection circuit 24 remains conductive, so that the output of the buffer amplifier 44 is kept at the "low" voltage and this "low" voltage is applied to the input terminal 47a of the NOR gate 18 which receives the "low" voltage at the other input terminal 47b through the closed switch 52.

Hence a "high" voltage is now output by the NOR gate 18. The "high" voltage is then output also by the buffer amplifiers 57 and 60 and thus the "high" voltage is applied to the input terminals 55a and 55b of the AND gate 10 as well as to the input terminals 56a and 56b of the NOR gate 16. Hence the AND gate 10 outputs the "high" voltage and the NOR gate 16 a "low" voltage. The AND gate 10, due to delay functions of the capacitors 12 and 62, outputs a "high" voltage a few seconds after the NOR gate 18 outputs a "high" voltage, whereas the NOR gate 16 outputs a "low" voltage almost simultaneously with the NOR gate 18 "high" voltage output. This avoids simultaneous conduction of the transistors 4 and 9 and the resultant short-circuiting of power source 2. As a result, the transistors 4 and 5 are made conductive by the "high" voltage from the NOR gate 18 and the motor 1 runs forward, whereby the shutter mechanism is charged along with idle film winding by the motor 1 running forward.

In response to completion of the shutter charging, the switch 52 is now opened to block the transistor 53, whereby the power supply to the control circuit 22 is thus stopped. As a result, supply of the bias current from the AND gate 10 to the base of the transistor 11 is cut, ie. the AND gate 10 stops generating the "high" voltage, the transistor 11 as well as the transistor 4 is blocked, and thus the power supply to the motor 1 is stopped.

Meanwhile, the transistor 19 is also blocked, as the flow of the bias current from the NOR gate 18 to the base of the transistor 19 is cut. At the same time, the transistors 14 and 20 receive at their respective bases the bias current resulting from discharge of the charge stored in the capacitor 12 in the course of the film winding operation, and therefore, for a given period of time, transistor 20 is made conductive and transistor 14 remains conductive. In response to the temporary conductive conditions of these transistors, the transistors 5 and 9 also become conductive and the motor 1 is short-circuited for the corresponding period of time.

Thus, when the shutter is released with the camera not loaded with film, the motor 1 runs forward upon completion of the exposing operation for idle winding of one frame of film and shutter charging. The above sequence of operation proceeds also when the camera is loaded with film until the film is over-tensioned when it has been fully wound up.

The following description is for the case where the camera is loaded with film. In this case the switch 37 is closed by the film detecting mechanism (not shown). The switch 52 is closed when the exposing operation in response to pressing the shutter release button is over, and the film winding operation follows in the same manner as described above. In the course of the film winding after exposure of all frames, the film is over-tensioned to force the motor 1 to stop, and the resultant increase of the motor current causes the transistor 27 of the film tension detection circuit 24 to be blocked as described above.

The capacitor 31 is then charged by the current from the constant-current power source 30. When the charged voltage of the capacitor 31 has reached the switching level of the buffer amplifier 44, the buffer amplifier 44 outputs a "high" voltage. In response to this "high" voltage the NOR gate 18 outputs a "low" voltage and, meanwhile, the transistors 40 and 49 are biased to become conductive. The condition conductive of transistor 40 causes the base of the transistor 27 to be grounded, whereby transistor 27 is kept blocked regardless of whether the transistor 26 is conductive or not. This means that it is then in a self-holding state.

With the shifting of the output of the buffer amplifier 44 from the "low" voltage level to the "high" voltage level, the outputs of the NOR gate 18 and the AND gate 10 are immediately shifted from the "high" voltage level to the "low" voltage level, and the transistor 11 is then blocked. Along with it, the transistor 4 is also blocked for the power supply to the motor 1 to be stopped. Accordingly the voltage of the terminal 32 is lowered roughly to ground. Hence, the transistor 26 changes from the saturated state to the active state to be capable of biasing the transistor 27 to make it conductive. However, since the transistor 40 has been already made conductive by the "high" voltage signal from the buffer amplifier 44, the transistor 27 remains blocked. That is, since a feedback circuit 54 using the transistor 40 is provided, the transistor 27 remains blocked even when power supply to the motor 1 is stopped with resultant lowering of the voltage at the terminal 32 and loss of the cause for the blocking of the transistor 27.

Further, due to the "low" voltage output by the aforesaid NOR gate 18, the transistors 14 and 20 are supplied with the bias current to their bases from the capacitor 12 to be conductive for a given period of time, and accordingly the transistors 5 and 9 also become conductive to short-circuit the motor for the corresponding period of time. The short-circuiting of the motor 1 for the given period of time serves to reduce the inductive electromotive force due to the residual torque from the forward running of the motor 1, in advance to the start of the reverse running of the motor 1 for the film rewinding. This presents voltage fluctuations at the time of the start of the reverse running of the motor 1 from affecting the feed back circuit 54 etc. After the capacitor 12 has been discharged the buffer amplifier 60 outputs a "low" voltage and the input to the input terminal 56b of the NOR gate 16 lowers to the "low" voltage level. Hence, receiving the "low" voltages at the both input terminals 56a and 56b after the lapse of the time required for decrease of the inductive electromotive force due to the residual torque from the forward running of the aforesaid motor 1, the NOR gate 16 outputs a "high" voltage which makes the transistors 8 and 9 conductive so that the power is supplied to the motor 1 in the direction opposite to that required for the film winding, whereby the motor 1 is now driven reverse in for the film to be rewound automatically.

The aforesaid capacitor 12 constitutes a delay circuit 63 which serves to delay the start of reverse running of the motor 1 after stopping of the power supply to the same for the forward running thereof until the influence of the inductive electromotive force due to the residual torque from forward running of the motor 1 becomes unnoticeable.

When the film has been rewound into the film magazine by the reverse running of motor 1 and the film leader end has come off the spool, the switch 37 is opened and the node 50 is brought to the "high" voltage level so that the transistor 33 is made conductive to discharge the capacitor 31, whereby the buffer amplifier 44 outputs a "low" voltage. Thus, the NOR gate 18 is now supplied with the "low" voltage to both of its input terminals 47a and 47b and outputs a "high" voltage. This "high" voltage output first causes the NOR gate 16 to immediately output a "low" voltage and this stops the power supply to the motor 1 in the direction required for its reverse running. Further, after the lapse of a delay time caused by the capacitors 12 and 62 the AND gate 10 is supplied with the "high" voltage to both of its input terminals 55a and 55b and outputs a "high" voltage.

Now the transistors 4 and 5 become conductive and the motor 1 is again driven forward for winding the film. By this forward driving, the shutter mechanism, which had been charged halfway at the time of the previous film winding until it was obstructed by the over-tension of the film, is now charged fully and upon completion of the shutter charging, the switch 52 is opened. With opening of this switch 52 the transistor 53 is now blocked and the power supply to the control circuit 22 is stopped.

Now the entire process of photographing up to rewinding of the film is over, and is ready for opening the back cover of the camera for taking out the film magazine.

The following description is of the procedure of rewinding the film before exposing all frames thereof.

In this case the camera is loaded with film, hence the switch 37 is closed. Also it is assumed that a shutter mechanism is completely charged with the switch 52 open. When, in this condition, the switch 46 is manually closed, the transistor 49 is made conductive by the bias current supplied through the resistors 45 and 48, and accordingly the transistor 53 becomes also conductive to supply the control circuit 22 with power. Meanwhile, the transistor 40 is also made conductive by the bias burrent supplied through the closed switch 46 and resistors 57 and 58, and accordingly the transistor 27 is blocked to allow the capacitor 31 to be charged.

The following description is of the condition of over-tensioning of the wound-up film. When the capacitor 31 has been charged to the predetermined level and the buffer amplifier 44 has come to outputs a "high" voltage, the transistor 27 is self-held in the blocked state by the described function of the feedback circuit 54. The NOR gate 18 now outputs a "low" voltage in response to the "high" voltage applied to its input terminal 47a so that the motor 1 is driven in reverse for rewinding the film. Thus, since the transistor 27 is kept in the self-held state by the function of the aforesaid feedback circuit 54, it suffices if the switch 46 is closed only for a very short time to simulate the condition of over-tensioning of the wound-up film. Then the motor 1 is driven in reverse by the control circuit 22, and the film is rewound to the end even if the switch is released to be opened.

Upon termination of the film rewinding the switch 37 is opened and the transistor 49 is blocked. In response to opening of switch 37, the transistor 33 is made conductive to discharge the capacitor 31, and the shutter charging operation follows in the same manner as aforesaid. When the switch 52 is opened in response to the completion of the shutter charging operation, the transistor 53 is blocked, so that power supply to the control circuit 22 is stopped.

The film tension detecting circuit 24 in the preferred embodiment described above may possibly be replaced by a known means consisting of a mechanical film tension detecting mechanism and a switch which responds to detection of increased tension of the film being transported by the above mentioned mechanism.

The above mentioned mechanical film tension detecting mechanism is known, for instance, the film stop motion device of U.S. Pat. No. 4,112,449. This device consists of a swingable displacement lever arranged to pivot coaxially with the film winding gear shaft and urged in one direction with its arm carrying on it a planetary gear meshed between the film winding gear and the side gear of its driving motor. The arm has mounted to one end thereof a contact switch for opening and closing the circuit of the film driving motor. This contact switch may be connected in series with the resistance 29 in place of the transistors 25 and 26 in the above mentioned circuit of the present invention.

When the wound-up film is over-tensioned, the film winding gear is stopped and the above mentioned planetary gear is unmeshed from the motor-side gear and moves on the winding gear. This movement causes the above mentioned displacement lever to swing and the swinging of its arm causes the contact switch to open so that power supply to the motor is stopped.

What is claimed is:

1. A motor-operated film driving device for cameras comprising:
   a reversible motor;
   a motor driving circuit arranged to be switchable between a first state for driving said motor forward for film winding, a second state for short-circuiting said motor and a third state for driving said motor in reverse for film rewinding;
   a film tension detecting means for detecting whether or not over-tension is exerted on said film due to forced stoppage of said film, said film tension detecting means generating a first continuous detection signal while said film is being wound up and a second continuous detection signal when said film is over-tensioned due to the forced stoppage thereof, said first and second continuous detection signals being distinguishably different in level from one another;
   a signal distinguishing means for distinguishing said second continuous detection signal from said first continuous detection signal to generate a switching signal; and
   a delay circuit which starts operation in response to said switching signal to generate a delay signal upon lapse of a predetermined period of time from generation of said switching signal;
   wherein said motor driving circuit is connected with said signal distinguishing means and said delay circuit such that it is switched from said first state to said second state in response to said switching signal and further switched to said third state in response to said delay signal, said predetermined time period being long enough to maintain said motor in said second state until disappearance of the electromotive force induced by the residual torque from the preceding forward motor running.

2. A motor-operated film driving device for cameras as recited in claim 1, further comprising a self-holding means which acts on said film tension detecting means in response to said second continuous detection signal for causing said film tension detecting means to hold said second continuous detection signal.

3. A motor-operated film driving device for cameras as recited in claim 2, wherein said film tension detecting means includes a current detection circuit for detecting the current flowing through said motor and for generating said first continuous detection signal with normal current flowing through said motor for the forward running thereof and said second continuous detection signal when said current has been increased to a predetermined level due to forced stoppage of said motor caused by the over-tension of the film.

4. A motor-operated driving film device for cameras as recited in claim 3, wherein said current detection circuit includes:
   a resistor connected in series with said motor,
   a level shift circuit for shifting the voltage appearing at one end of said resistor by a predetermined constant level, and
   a transistor connected such that the output voltage of said level shift circuit is applied to the transistor base and adapted to become conductive for generating said second continuous detection signal upon rise of said voltage at one end of said resistor due to increase of the motor current.

5. A motor-operated film driving device for cameras as recited in claim 1 further comprising a manual switch for causing said signal distinguishing means to generate said switching signal.

* * * * *